United States Patent
Sobolewski et al.

(10) Patent No.: US 10,881,207 B2
(45) Date of Patent: Jan. 5, 2021

(54) ITEM OF FURNITURE AND WALL ELEMENT FOR AN ITEM OF FURNITURE

(71) Applicant: AMBIGENCE GMBH & CO. KG, Herford (DE)

(72) Inventors: Uwe Sobolewski, Bünde (DE); Norbert Poppenborg, Bad Salzuflen (DE); Stefan Andschus, Lübbecke (DE); Michael Tasche, Bielefeld (DE); Gerhard Götz, Bünde (DE)

(73) Assignee: AMBIGENCE GMBH & CO. KG, Herford (DE)

( * ) Notice: Subject to any disclaimer, the term of this patent is extended or adjusted under 35 U.S.C. 154(b) by 0 days.

(21) Appl. No.: 16/489,174

(22) PCT Filed: Feb. 23, 2018

(86) PCT No.: PCT/EP2018/054531
§ 371 (c)(1),
(2) Date: Aug. 27, 2019

(87) PCT Pub. No.: WO2018/158153
PCT Pub. Date: Sep. 7, 2018

(65) Prior Publication Data
US 2019/0380494 A1    Dec. 19, 2019

(30) Foreign Application Priority Data
Feb. 28, 2017   (DE) .................. 10 2017 104 183

(51) Int. Cl.
*A47B 95/00*    (2006.01)
*A47B 96/20*    (2006.01)
(Continued)

(52) U.S. Cl.
CPC .............. *A47B 96/205* (2013.01); *E05D 3/06* (2013.01); *F16B 5/0012* (2013.01); *F16B 12/14* (2013.01);
(Continued)

(58) Field of Classification Search
CPC ....... E05D 15/463; E05D 3/06; F16B 5/0012; F16B 12/14; F16B 2012/103;
(Continued)

(56) References Cited

U.S. PATENT DOCUMENTS 2,360,451 A   10/1944  Stone
3,023,910 A    3/1962  Schless
(Continued)

FOREIGN PATENT DOCUMENTS

DE   1867127 U   2/1963
DE   1900741 U   9/1964
(Continued)

OTHER PUBLICATIONS

English Translation of Held (DE102015113427) (Year: 2020).*
(Continued)

*Primary Examiner* — Matthew W Ing
(74) *Attorney, Agent, or Firm* — Patent Portfolio Builders PLLC

(57) ABSTRACT

An item of furniture includes at least one fitting for guiding a movable furniture part and at least one plate-shaped wall element, into which the at least one fitting is integrated, and at least one connecting element for connecting to an additional furniture component.

12 Claims, 7 Drawing Sheets

Figure 1:
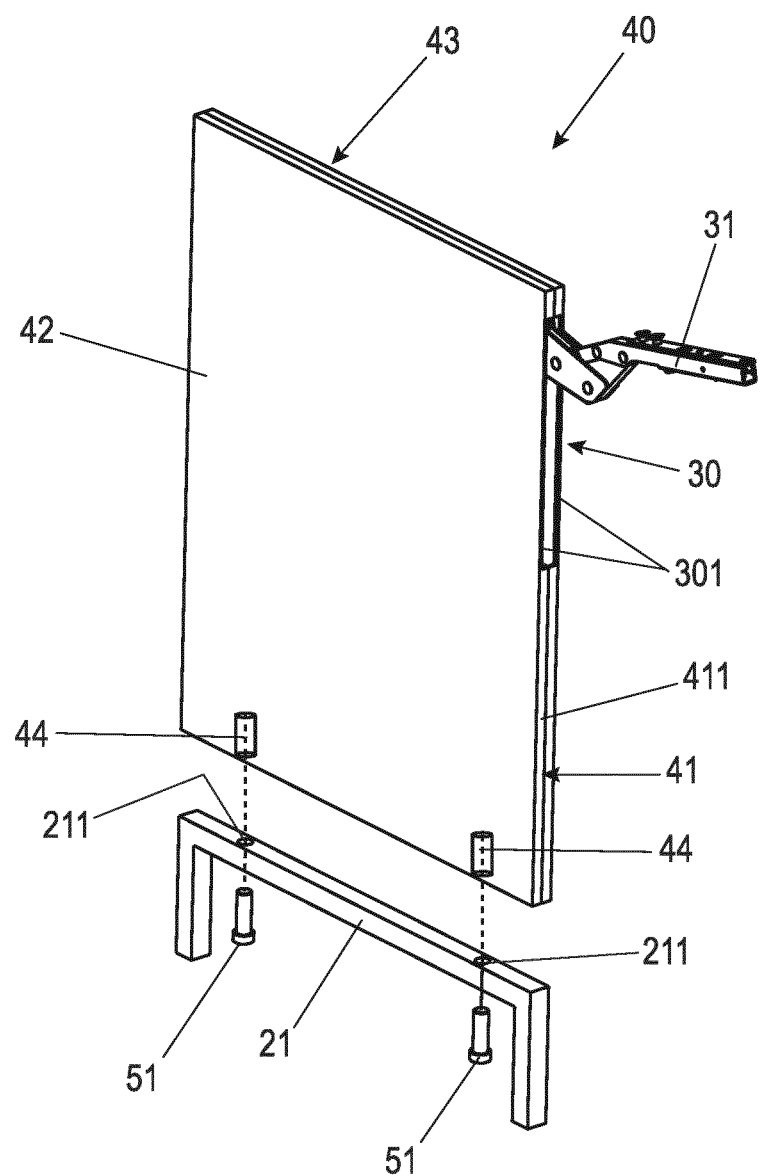

(51) Int. Cl.
*E05D 3/06* (2006.01)
*F16B 5/00* (2006.01)
*F16B 12/14* (2006.01)
*F16B 12/10* (2006.01)

(52) U.S. Cl.
CPC ..... *E05Y 2900/20* (2013.01); *F16B 2012/103* (2013.01)

(58) Field of Classification Search
CPC ....... A47B 77/022; A47B 77/08; A47B 77/14; A47B 96/205; E05Y 2900/20
See application file for complete search history.

(56) References Cited

U.S. PATENT DOCUMENTS

| | | | |
|---|---|---|---|
| 3,951,558 A * | 4/1976 | Komarov | F16B 12/14 403/231 |
| 4,108,514 A | 8/1978 | Zimmerman | |
| 5,720,547 A * | 2/1998 | Baird | A47B 77/16 220/552 |
| 9,386,847 B1 | 7/2016 | Jeffries | |
| 2004/0239216 A1 | 12/2004 | Castillo | |
| 2009/0026163 A1 * | 1/2009 | Lee | F16B 12/24 211/189 |
| 2019/0166992 A1 | 6/2019 | Held | |
| 2019/0316394 A1 * | 10/2019 | Kruedener | E05F 1/1058 |
| 2019/0383079 A1 * | 12/2019 | Sobolewski | A47B 77/00 |
| 2020/0008578 A1 * | 1/2020 | Sobolewski | A47B 96/04 |
| 2020/0008579 A1 * | 1/2020 | Sobolewski | A47B 96/04 |
| 2020/0060422 A1 * | 2/2020 | Sobolewski | A47B 96/205 |

FOREIGN PATENT DOCUMENTS

| | | | |
|---|---|---|---|
| DE | 1559963 A1 | 12/1969 | |
| DE | 2617614 A1 | 11/1976 | |
| DE | 202013003189 U1 | 7/2014 | |
| DE | 202014105730 U1 | 3/2016 | |
| DE | 102015113427 A1 * | 2/2017 | ............. A47B 77/00 |
| FR | 2387617 A1 | 11/1978 | |
| JP | 2015181755 A | 10/2015 | |
| WO | 2010130569 A1 | 11/2010 | |
| WO | 2010130570 A1 | 11/2010 | |
| WO | WO-2016207334 A1 * | 12/2016 | ............. F16B 12/46 |
| WO | 2017029199 A1 | 2/2017 | |

OTHER PUBLICATIONS

International Search Report dated Apr. 17, 2018 in related/corresponding International Application No. PCT/EP2018/054531.
Search Report dated Oct. 26, 2017 in related/corresponding DE Application No. 10 2017 104 183.4.
Written Opinion dated Apr. 17, 2018 in related/corresponding International Application No. PCT/EP2018/054531.

* cited by examiner

ITEM OF FURNITURE AND WALL ELEMENT FOR AN ITEM OF FURNITURE

BACKGROUND AND SUMMARY OF THE INVENTION

Exemplary embodiments of the invention relate to an item of furniture having at least one fitting for guiding a movable furniture part. Exemplary embodiments of the invention also relate to a plate-shaped wall element for an item of furniture.

In general, items of furniture comprise a furniture body, which typically consists of at least four walls, namely two side walls, a top panel, and a bottom panel. These walls are fixedly connected to one another and form a structural unit, the furniture body. To be able to close an opening of the furniture body facing forward, fittings are installed on the inside on the furniture body, which guide doors, flaps, drawers having a drawer front panel, or other movable furniture parts.

As an alternative to fastening the fittings on the furniture body, in the case of door hinges, milling a pocket into an end face of a side wall of the furniture body, into which the door hinge is insertable from the front, is known. A hinge suitable for insertion into such a milled-in pocket is known, for example, from the document DE 155 9963.

DE 20 2013 003 189 U1 discloses a further manner of installing a hinge inside a furniture body. In this case, a side wall of the furniture body is constructed in portions from different parts, wherein a rear part facing away from a furniture front is formed conventionally, for example, by a coated wood element. A front part of the side wall is formed by a housing (not described in greater detail in the cited document), which comprises at least one frontal opening, into which a fitting can be inserted. In this manner, fittings having a greater installation depth can also be used, which is not possible using milling performed on an end face.

Independently of whether the hinges are placed on the inside on a side wall of the furniture body or are inserted into the side wall, known items of furniture are based on the use of a generally cuboid furniture body as a main element, on which movable furniture parts are fastened via fittings.

Exemplary embodiments of the present invention are directed to an item of furniture, which is based on a main element to be used more flexibly.

An item of furniture according to the invention is distinguished in that it comprises at least one plate-shaped wall element, in which a fitting is integrated and which comprises connecting elements for connection to further furniture components.

An item of furniture according to the invention is thus not based on a prefinished furniture body, but rather comprises the at least one plate-shaped wall element as a main component, which can be connected to further furniture components. Because the wall element contains both the fitting and also connecting elements in integral form, it enables a flexible construction of an item of furniture using further components that do not have to accommodate further functional elements. This results in great flexibility in, for example, the material selection and the dimensioning of the further furniture components. They can be manufactured, for example, of materials which are more difficult to process, such as glass, stone, or metal, since they do not have to accommodate any fittings, for example.

In the scope of the application, the wall element can be used in the item of furniture in any alignment. In particular, the wall element can be a (vertical) side wall or intermediate wall or also a (horizontal) top, bottom, or intermediate panel. An inclined, for example, diagonal arrangement is also possible.

In one advantageous embodiment of the item of furniture, an in turn plate-shaped element can be used as a further furniture component, which has a surface on which the at least one plate-shaped wall element abuts with an end face. In this manner, a shelf-like construction can be achieved, wherein flaps or doors can be provided for closing compartments which are formed by the plate-shaped walls and/or the further plate-shaped components.

Preferably, at least two plate-shaped wall elements having integrated fitting are provided, which are arranged parallel to one another. A cuboid element, for example, a box open to the front, is inserted between the two parallel wall elements. This cuboid element is preferably manufactured from a different material than the wall element. While the wall element is preferably manufactured from a wood or wood-based material, which can preferably be processed by cutting, as the main material, the cuboid element can be manufactured from materials such as glass, stone, or concrete, which can be processed by cutting only with difficulty and in particular not at all and in turn can accommodate fittings not at all or only with a high level of manufacturing expenditure.

In one advantageous embodiment of the item of furniture, the bottom and/or top panel forms the width of the item of furniture and at least one plate-shaped wall element is spaced apart at least 10 cm from an outer edge of the bottom and/or top panel. In this manner, the plate-shaped wall element additionally divides the interior of the item of furniture. It guides the fitting and is used simultaneously as an organization and/or structuring element for the interior.

An embodiment involves a plate-shaped wall element, which comprises an integrated fitting and integrated connecting elements for connection to further furniture components. Such a wall element enables the construction of the above-described item of furniture. The advantages described in conjunction with the item of furniture thus result.

In advantageous embodiments of the wall element, the at least one connecting element is a threaded insert or a combination of a longitudinal hole and a transverse hole for accommodating a rotating connector. The further furniture components to be connected to the wall element can accordingly be fastened via screws or bolts having a connecting head, behind which the rotating connector engages. A profile groove can also be formed or a tongue can be arranged or formed as a connecting element in the wall element. Accordingly, a matching tongue, for example, in the form of a profile strip, or a matching profile groove, respectively, is provided on the further furniture component to be connected.

In a further advantageous embodiment, the wall element comprises at least one core, which is arranged in a plane with the fitting, wherein the at least one core and the fitting are arranged between two continuous cover layers. A wall element constructed in this manner is distinguished by continuously identical appearance and haptics of its lateral surface. The core can be manufactured, for example, from wood or a wooden composite material such as MDF (medium-density fiberboard) or HDF (high-density fiberboard). To save weight, the core can also comprise a light construction material, for example, paperboard in a honeycomb structure, in portions.

The fitting is advantageously already integrated into the wall element during the assembly thereof. A larger fitting having a large installation depth, which even extends beyond substantially the entire width of the wall element, for example, can thus also be used. In particular, flap fittings can be used, the lever mechanism of which can be retracted completely (possibly except for installation elements on which the movable furniture part is fastened) into an opening in an end face of the wall element.

The two continuous cover layers are preferably connected in a planar manner to the at least one core and/or the fitting, for example, laminated on. The planar connection stabilizes the wall element and enables the use of relatively thin cover layers having thicknesses in the range of tenths of millimeters.

BRIEF DESCRIPTION OF THE DRAWING FIGURES

Figure 2A:
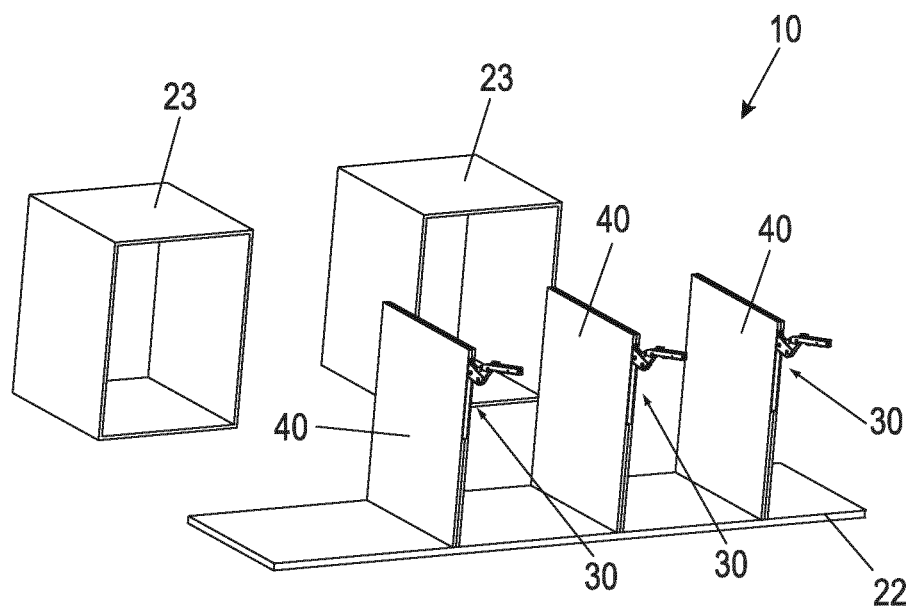
Figure 3:
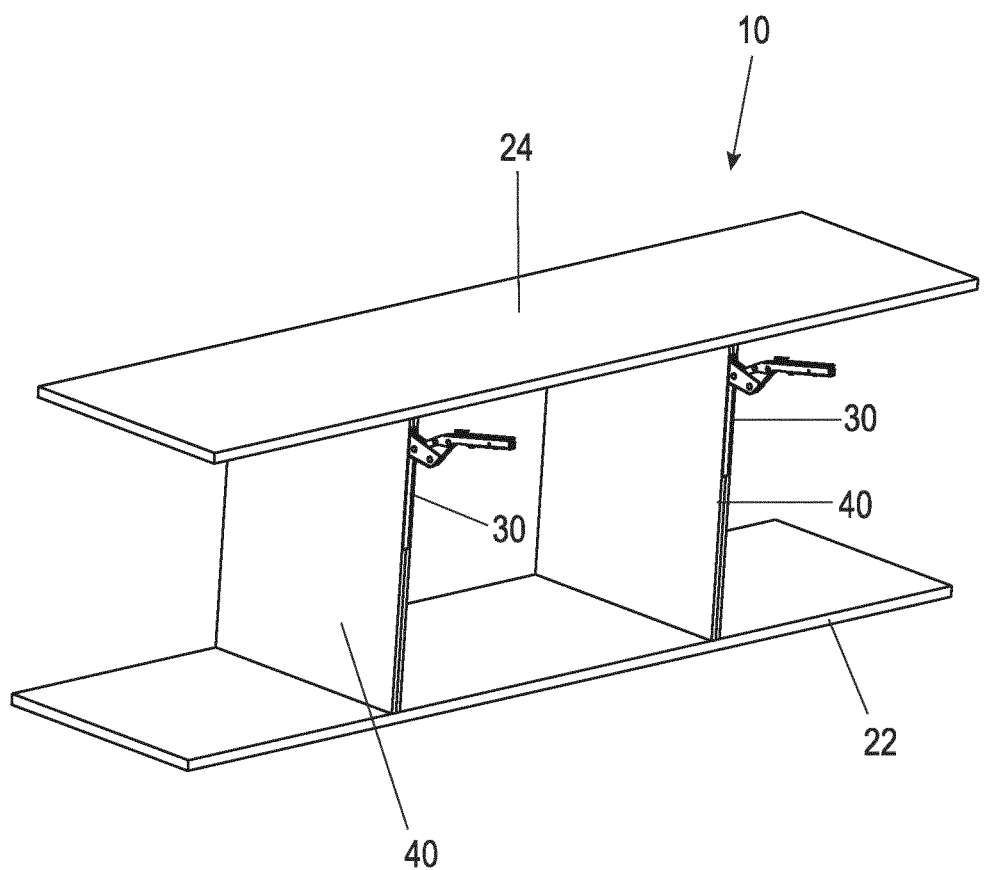
Figure 4:
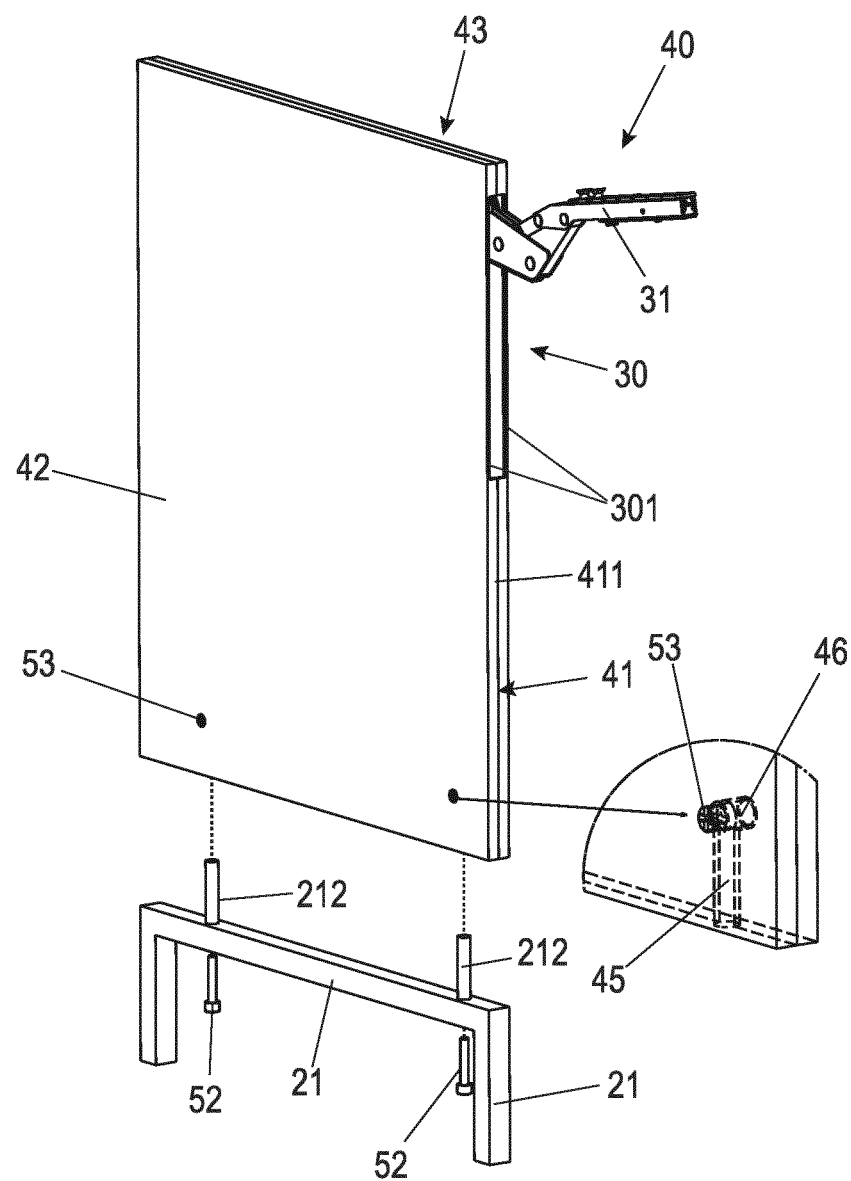
Figure 5:
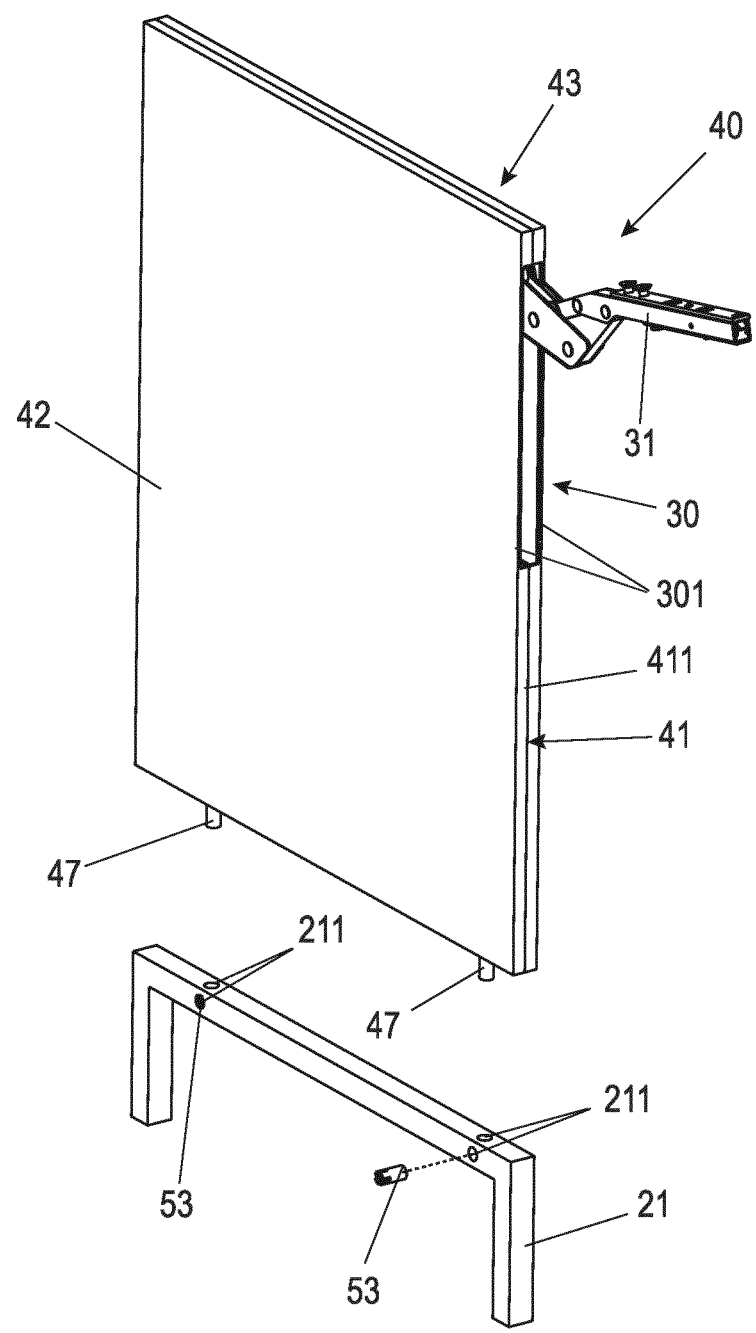
Figure 6:
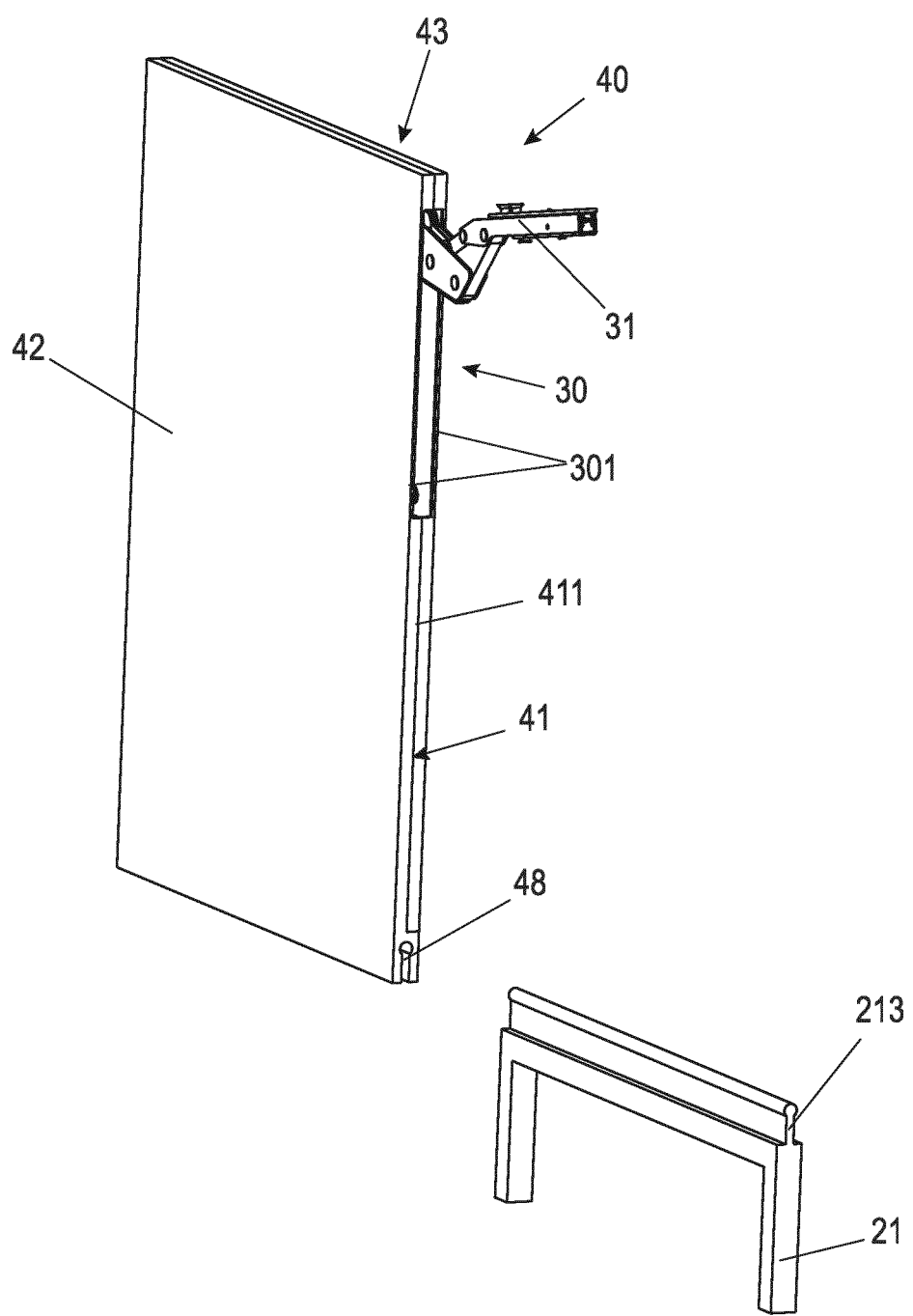
Figure 7:
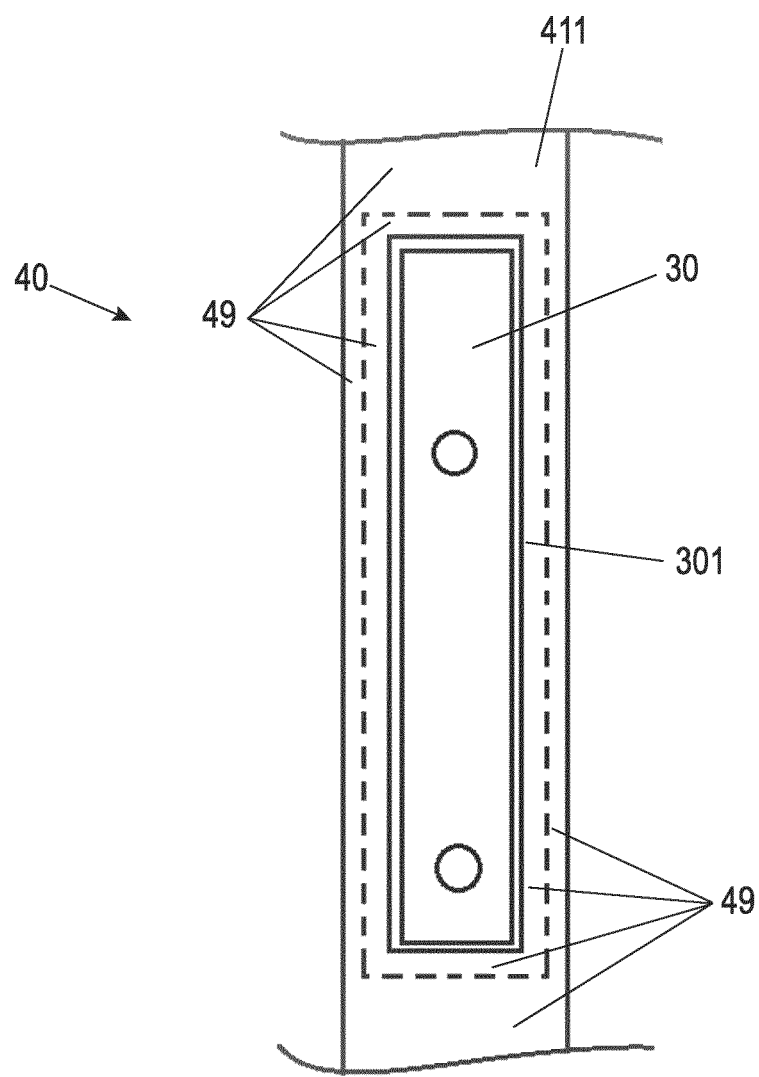

The invention will be explained in greater detail hereafter on the basis of exemplary embodiments with the aid of figures. In the figures:

FIG. 1 shows an isometric exploded view of a side wall for an item of furniture having a furniture base;

FIGS. 2a, b show different isometric views of an item of furniture having multiple wall elements according to the application;

FIG. 3 shows a further exemplary embodiment of an item of furniture having two wall elements according to the application in an isometric view;

FIGS. 4-6 each show a further exemplary embodiment of a wall element having a furniture base in an illustration similar to FIG. 1; and FIG. 7 shows a schematic top view of a front end face of a wall element in the region of an inserted fitting.

DETAILED DESCRIPTION

FIG. 1 shows an isometric diagonal view of a wall element 40 according to the application, in which a fitting 30 is integrated.

The plate-shaped wall element 40 comprises a core 41, for example, manufactured from a chipboard plate or from a medium-density or high-density fiberboard (MDF or HDF, respectively). The fitting 30 is arranged in the same plane as the core 41 and preferably having equal thickness, in such a manner that the core 41 and the fitting 30 supplement one another in shape and size so that together they have the dimensions of the wall element 40.

In the illustrated exemplary embodiment, the core 41 is formed in two parts and is divided in the plane of the lateral extension of the plate-shaped wall element 40. A recess, into which the fitting 30 is inserted, is introduced into each of the core halves. The core 41 or its two halves and the fitting 30 can be connected to one another via connecting elements (not visible here), for example, screws, clamps, pins, crimps, or the like. An adhesive bond can also be provided in addition to the mentioned connecting elements or as the only connection.

As an alternative to the illustrated two-part core 41, the core can also be formed in one piece having a recess into which the fitting 30 is inserted.

Cover layers 42, 43 are applied, in particular adhesively bonded or laminated onto the arrangement made of the core 41 and the fitting 30 possibly connected thereto. The fitting 30 is selected in this case with respect to its material and the material thickness, for example, of side plates 301 of the fitting 30 so that it is also not compressed during a lamination process, which otherwise could result in an irregularity of the surface of the cover layers 42, 43. Smaller irregularities in the side plates of the fitting 30 are compensated for by the cover layers 42, 43. Such smaller irregularities can originate, for example, due to bearing points of bolts, which are used for the pivotable mounting of the lever mechanism 31 in the fitting 30.

In the present case, the fitting 30 is a flap fitting, which guides a flap pivotable around a horizontal axis, via which a furniture opening can be closed. Such a flap is not shown in FIG. 1 for reasons of comprehensibility. Only an extended part of a lever mechanism 31 is visible of the fitting 30 in FIG. 1. The fitting 30 is integrated into the wall element 40 so that in the closed state of the flap guided by the fitting 30, the lever mechanism 31 is retracted completely into the wall element 40, specifically into a front end face 411, possibly except for installation elements for the connection to the flap.

In addition, the wall element 40 comprises connecting elements for the connection to further furniture components. A U-shaped furniture base 21 is shown by way of example as such a further furniture component in FIG. 1.

Threaded inserts 44, which are used as connecting elements for the connection of the wall element 40 to the furniture base 21, are inserted concealed in the core 41 at a lower end face in the wall element 40. Correspondingly positioned boreholes 211, through which screws 51 are guided, which are screwed into the threaded inserts 44, are applied in the furniture base 21.

With the integrated fitting 30 and the connecting elements, the wall element 40 comprises all required technical functional elements to be able to construct an item of furniture even without an explicit furniture body.

Figure 2B:
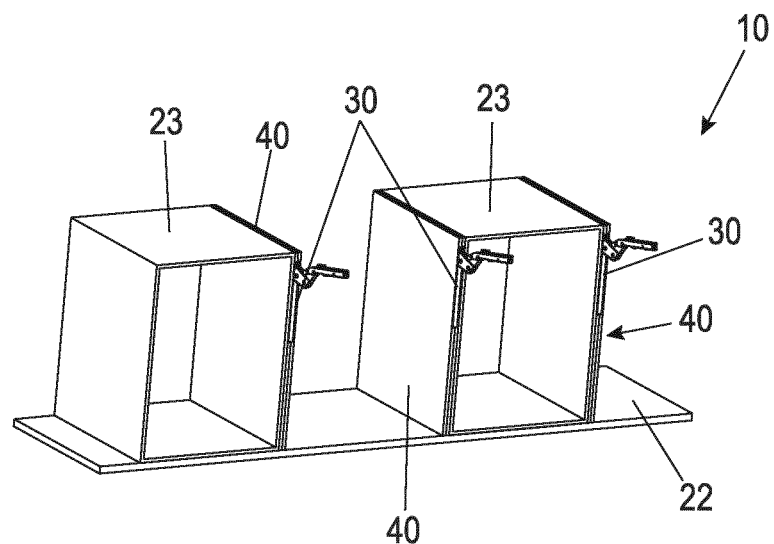

FIGS. 2a and 2b show an item of furniture 10 according to the application, which comprises a plurality of the wall elements 40 shown in FIG. 1. FIG. 2a shows the item of furniture in a partially assembled state and FIG. 2b shows it assembled.

The item of furniture 10 comprises, in the illustrated state, three wall elements 40 each having integrated fitting 30, which are connected using the lower end face thereof to a continuous bottom panel 22 as furniture components. For the connection, connecting elements integrated into the wall element 40 are again used, for example, the threaded inserts 44 shown in FIG. 1, into which screws (not visible here) are screwed from below.

Boxes 23 open at the front, which provide interiors of the item of furniture 10 here by way of example, are set between two of the wall elements 40 and/or on one of the wall elements 40. Since all technical functional elements such as the fitting 30 and the connecting elements are already contained in the wall elements 40, the boxes 23 can be formed freely with regard to the material selection and can be constructed, for example, from glass, stone, or metal.

FIG. 3 shows, also in an isometric illustration, a further example of an item of furniture according to the application. Two spaced-apart wall elements 40 aligned parallel to one another are used in this case, which are in turn set up on a bottom panel 22, similarly as in the example of FIGS. 2a, b, and are connected thereto via the integrated connecting elements.

The wall elements 40 moreover have comparable connecting elements on the opposing top end face, via which they are connected to a top panel 24 placed on top. A shelf-like item of furniture results, the front face of which is closable entirely or in the region between the two wall elements 40 using a flap (not shown here).

In FIGS. 4, 5, and 6, further exemplary embodiments of a wall element 40 having integrated fitting 30 and integrated connecting elements for connection to further furniture components are shown in each case in the same manner as in FIG. 1.

Identical reference signs identify identical or identically acting elements in these figures as in the above-described figures. Reference is made to the statements on FIG. 1 with respect to the main structure of the wall element 40.

In the exemplary embodiment of FIG. 4, longitudinal boreholes 45 are introduced as fastening means into the core 41 from the bottom end face, which merge into transverse boreholes 46, which are introduced from a cover layer (the cover layer 42 here) into a side face of the wall element 40. Rotating connectors 53 are inserted into the transverse boreholes 46, which interact with bolts 52, which are inserted through the furniture base 21 into the longitudinal boreholes 45. The bolts 52 have heads (not shown in the figure) at the end thereof, which are grasped by the rotating connectors 53. The surfaces engaging behind the head are preferably formed eccentrically in the rotating connector 53 in this case, so that the bolts 52 are drawn into the wall element 40 and accordingly the furniture base is drawn toward the wall element 40. A loadbearing connection is thus achieved between the furniture base 21 and the wall element 40. In addition, drilled-through dowels 212 can be provided on the furniture base 21 as in the illustrated example, which can be inserted into the longitudinal borehole 45 and through which the bolts 52 are guided.

It is apparent that the illustrated type of the connection and the connecting element formed in the wall element 40 can be provided not only on the bottom end face shown here by way of example for the connection to the furniture base 21 but rather also on the top and/or the rear end face. Furthermore, it is to be noted that the connection to the furniture base 21 is solely by way of example. The connecting elements shown in FIGS. 4-6 can also be used, for example, for connection to the bottom panel 22 and/or the top panel 24 in the exemplary embodiments of FIGS. 2a, 2b, and 3.

In the exemplary embodiment of FIG. 5, a rotating connector 53 is also used in conjunction with a bolt, wherein the rotating connector 53 is inserted into a corresponding borehole 211 in the furniture base 21 in this case. Two bolts 47 are again arranged by way of example on the bottom end face on the wall element 40 here, which are inserted into the borehole 211 of the furniture base 21 and are fastened with the aid of the rotating connector 53. The bolts 47 can be provided with a thread, for example, and can be screwed into corresponding boreholes in the core 41 of the wall element 40.

In the example of FIG. 6, a tongue-and-groove connection is provided between the wall element 40 and the further furniture component, again a furniture base 21 by way of example here. For this purpose, a profile groove 48 is preferably formed on the bottom end face of the wall element 40 over the entire width of the wall element 40, into which a correspondingly formed profile strip 213 is inserted, which is arranged or formed on the furniture base 21. For example, the profile groove 48 has a profile in the shape of a keyhole or mushroom. It is apparent that other undercut profiles, for example, a trapezoidal profile, a T-shaped profile, or a Christmas tree profile can be used.

FIG. 7 shows a top view of a front end face 411 of a wall element 40 in the region of the fitting 30. In this exemplary embodiment, an edge band 49 is applied as a narrow side coating to the front end face 211 of the core 21 and thus that of the wall element 40.

The edge band 49 is omitted in the region of the opening of the fitting 30, from which the lever mechanism 31 (not visible in this illustration) extends, for example. The edge band 49 is applied to the front end face 411 after integration of the fitting 30 into the wall element 30 or also after insertion of the fitting 30 into the wall element 40.

The edge band 49 is cut out so that it rests in portions on the fitting and, for example, covers the edges of the side plates 301 of the fitting 30 or other elements visible outside the opening of the fitting 30. The outlines of the fitting 30 are indicated by dashed lines in FIG. 6. Due to the arrangement of the edge band 49 also on portions of the fitting 30, the fitting 30—except for the extendable lever mechanism 31—is integrated completely into the wall element 40 and is no longer visible on its front end face 411.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 10 item of furniture
21 furniture base
211 borehole
212 dowel
213 profile strip
22 bottom panel
23 box
24 top panel
30 fitting
301 side plate
31 lever mechanism
40 wall element
41 core
411 front end face
42, 43 cover layer
44 threaded insert
45 longitudinal borehole
46 transverse borehole
47 bolt
48 profile groove
49 edge band
51 screw
52 bolt
53 rotating connector

The invention claimed is:

1. An item of furniture, comprising:
at least one fitting for guiding a movable furniture part, and
at least one plate-shaped wall element, into which the at least one fitting is integrated and which comprises at least one connecting element configured to connect to a further furniture component, wherein the at least one plate-shape wall element further comprises at least one core, which is arranged in a plane with the at least one fitting, wherein the at least one core comprises
one piece having a recess into which the at least one fitting is integrated, or
two parts divided in a plane of a lateral extension of the plate-shaped wall element with a recess formed in each of the two parts and the at least one fitting is integrated into the recess formed in each of the two parts, wherein the at least one core and the at least one fitting are arranged between two continuous cover layers, wherein the two continuous cover layers are connected in a planar manner to the at least one core and/or the at least one fitting, and wherein the at least one fitting comprises a lever mechanism configured to guide the movable furniture part.

2. The item of furniture of claim 1, further comprising:
at least one plate-shaped element as a further furniture component, the at least one plate-shaped element as the further furniture component having a face on which the at least one plate-shaped wall element abuts with an end face.

3. The item of furniture of claim 2, wherein the at least one plate-shaped element as the further furniture component is a bottom and/or a top panel.

4. The item of furniture of claim 3, wherein the bottom and/or top panel form a width of the item of furniture and the at least one plate-shaped wall element is spaced apart at least 10 cm from an outer edge of the bottom and/or top panel.

5. The item of furniture of claim 2, wherein the at least one plate-shaped wall element comprises at least two plate-shaped wall elements that are arranged parallel to and spaced apart from one another.

6. The item of furniture of claim 5, wherein a box is arranged between the at least two plate-shaped wall elements.

7. A plate-shaped wall element for an item of furniture, comprising:

at least one integrated fitting;
at least one integrated connecting element configured to connect to at least one further furniture component; and
at least one core, which is arranged in a plane with the at least one integrated fitting, wherein the at least one core comprises
one piece having a recess into which the at least one fitting is integrated, or
two parts divided in a plane of a lateral extension of the plate-shaped wall element with a recess formed in each of the two parts and the at least one fitting is integrated into the recess formed in each of the two parts, wherein the at least one core and the at least one integrated fitting are arranged between two continuous cover layers, wherein the two continuous cover layers are connected in a planar manner to the at least one core and/or the at least one integrated fitting, and wherein the at least one integrated fitting comprises a lever mechanism configured to guide a movable furniture part.

8. The plate-shaped wall element of claims 7, wherein the at least one integrated connecting element is a threaded insert.

9. The plate-shaped wall element of claims 7, wherein the at least one integrated connecting element is a combination of a longitudinal hole and a transverse hole configured to accommodate a rotating connector.

10. The plate-shaped wall element of claims 7, wherein the at least one integrated connecting element is a profile groove or a tongue.

11. The plate-shaped wall element of claims 7, wherein the two continuous cover layers are laminated in a planar manner onto the at least one core and/or the at least one integrated fitting.

12. The plate-shaped wall element of claims 7, wherein the lever mechanism is located completely between the cover layers in a closed state of the movable furniture part.

* * * * *